2 Sheets--Sheet 1.

T. H. CARROLL.
Sawing-Machines.

No. 141,761. Patented August 12, 1873.

Attest:
J. Mason Goszler
G. B. Fowler

Inventor:
Thomas H. Carroll
By N. Cranford
atty.

T. H. CARROLL.
Sawing-Machines.

No. 141,761.   Patented August 12, 1873.

Attest:
J. Mason Gotzler
G. B. Towles.

Inventor.
Thomas H. Carroll
By N. Crawford atty.

UNITED STATES PATENT OFFICE.

THOMAS H. CARROLL, OF ERIE, PENNSYLVANIA.

IMPROVEMENT IN SAWING-MACHINES.

Specification forming part of Letters Patent No. 141,761, dated August 12, 1873; application filed July 12, 1873.

*To all whom it may concern:*

Be it known that I, THOMAS H. CARROLL, of Erie, in the county of Erie, in the State of Pennsylvania, have made certain Improvements in Sawing - Machines for Sawing Lumber into Strips, of which the following is a specification:

The invention relates to a machine where two or more circular saws are used for slitting lumber into strips of a given width; and it consists in the construction of the parts and their arrangement with each other in such manner that the saws are adjusted and secured to cut any required width, or to cut strips of different widths from the same board or plank, as will be hereinafter fully described.

Figure 1:
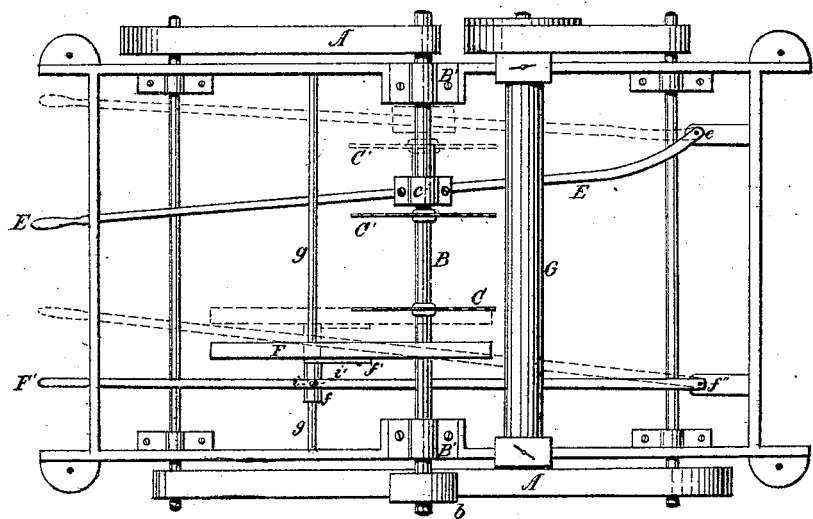
Figure 2:
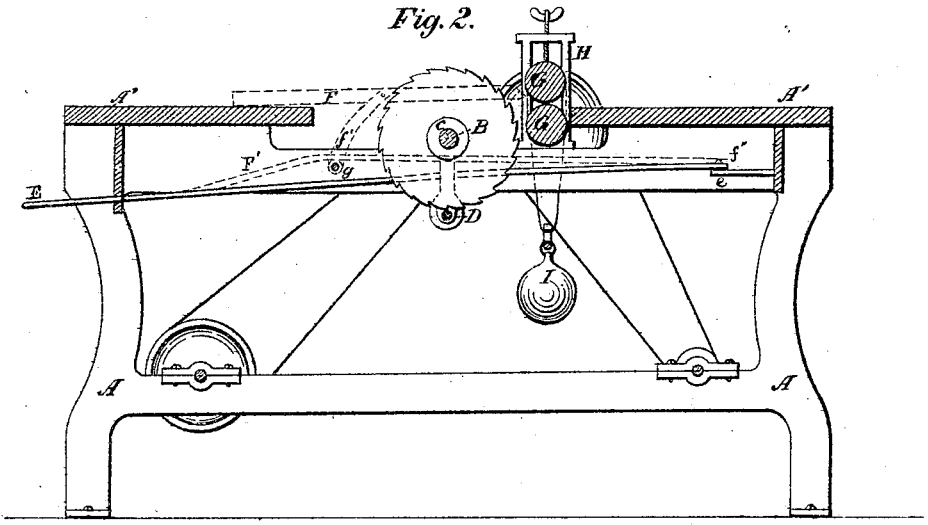
Figure 3:
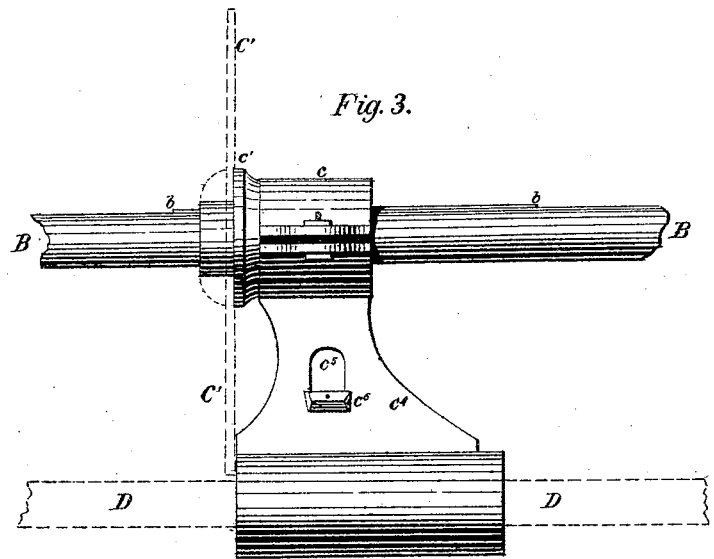

In the drawings, Figure 1 represents a top view of the machine with the table removed; Fig. 2, a side view; and Figs. 3, 4, and 5, details.

Figure 4:
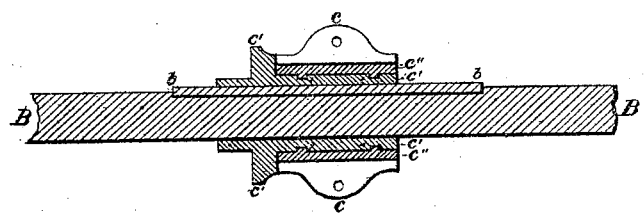
Figure 5:
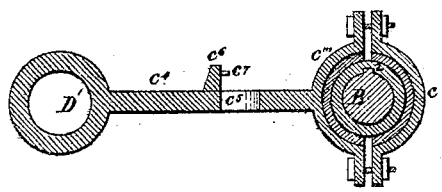

A represents the supporting-frame, and A' sections of a removable table. B is a transverse saw arbor or shaft, revolving in boxes B' secured to frame A near each end of the shaft. $b$ is a pulley on the end of shaft B, and by which it and its saws are revolved by any convenient power applied through any arrangement of belts and pulleys or train of gear-wheels for communicating motion to other parts of the machine. C is a saw fast on shaft or arbor B, and secured thereto by any sufficient means. C' is another saw on the same shaft B, and is secured to a sliding and revolving sleeve and collar, $c'$, and revolves and slides with said sleeve $c'$. $c$ is the upper piece or cap of a sliding journal-box, and, with part $c'''$, surrounds the revolving sliding sleeve $c'$, and slides or moves horizontally around the saw - shaft B. Sleeve $c'$ has two or more grooves, 1 1, cut into its outer surface, as seen in Fig. 4, and is smaller in diameter than the inner diameter of the box $c$ and $c'''$, so as to receive the lining of Babbitt metal $c''$ that surrounds the sliding sleeve and fills the grooves 1 1, so that the sliding sleeve and collar $c'$ will reciprocate with the box $c$ and $c'''$ when that is reciprocated. Sleeve $c'$ has also a longitudinal groove, 2, in its inner diameter, which receives feather $b$ that is inserted longitudinally in shaft B, and insures the revolution of the sleeve and saw with the shaft B without interfering with its reciprocation. The lower part of the box $c'''$ has an arm, $c^4$, extending downward, forming an eye, D', as seen in Fig. 5. D is a guide - rod going transversely across the machine, and directly underneath the saw-arbor B, and secured firmly to the frame A, and it receives, sustains, and guides the sliding box $c$ in causing the saw C' to reciprocate or slide on the saw-shaft B. Arm $c^4$ has a mortise, $c^5$, through it between the box part $c'''$ and eye D' to receive the actuating-lever. E is a hand-lever, pivoted at $e$ to a convenient part of the frame A, or any fixed part, and passing backward and through mortise $c^5$ of arm $c^4$ to the rear end of the machine, or where the operator stands, where it rests in notches in a bar at the said rear end of the machine, which notches receive and hold the lever at any desired point of its vibrations, this lever passing through the arm $c^4$; and, as it is vibrated in either direction, will cause the arm $c^4$ to move in one or the other direction, and, with it, the sliding sleeve and collar $c'$ and saw C'; and, by the eye D' of arm $c^4$ sliding upon, and being guided by, the rod D, insures a true, even, easy, and sure reciprocation of the saw-sleeve upon the shaft B, obviating any binding or clamping upon shaft B, or guide-rod D by reason of the power that moves $c'$ being applied centrally between the shaft B and guide-rod D. F is an adjustable gage, placed parallel to the plane of the fixed saw C and on the opposite side of saw C from the sliding saw C', and can be adjusted to any distance from the saw C, as may be desired. $f$ is a long sliding sleeve, sliding upon transverse rod $g$, and has a bent and upwardly-projecting arm, $f'$, that is fast to gage F at its upper end. F' is a hand-lever, pivoted at its forward end, at $f''$, to any fixed part of frame A, is bent to pass over sleeve $f$, and has a slot, $i$, through it where it passes over sleeve $f$, in which a fulcrum - pin, $i'$, goes, and is fast in sleeve $f$; while the operating end goes back past, and rests upon, the same notched bar that supports and holds lever E in position.

By this construction the gage F is moved in either direction toward or from the fixed saw C; and, when the end of the lever F rests in a notch the gage is securely held to its position, while the long sleeve, sliding upon the guide-rod $g$, allows the gage to be easily and truly moved in either direction.

If necessary, more than one arm $f'$ may go from the sleeve $f$ to the saw-gage F; when it will be easily seen that there will be more strength in the device, and, at the same time, hold the gage more firmly.

G G are carrying or guide rollers that take hold of the sawed strips and carry them forward, and act, also, as feed-rollers after the strips go between them, and feed and guide the strips truly through the machine; and are revolved in bearings in a frame, H, and the upper roller made yielding by applying weight I to act upon said upper roller.

No feed-rollers are used that take hold of the lumber before it reaches the saw; and, by such arrangement, the operator is enabled to see, when the end of the lumber is placed upon the table, whether the sliding saw or gage should be moved, so that all the lumber in board or plank may be utilized by even saving a half or quarter inch in width to a strip or to each strip. If feed-rollers took hold of the plank or board before the same is presented to the saw, the operator could not draw the board or plank back, and adjust the movable saw or gage to save the narrow strip as he could where no feed-rollers feed the stuff to the saws in advance of the saws cutting the lumber.

Having thus described my invention, what I claim, and desire to secure by Letters Patent, is—

1. The sliding sleeve and collar $c'$, having grooves 1 1, in combination with the box $c\ c'''$, having the lining of metal $c''$, when constructed to operate in the manner described.

2. The combination of the revolving and sliding sleeve and collar $c'$ carrying saw C', box $c\ c'''$ having arm $c^4$ and eye D', and hand-lever E, with the guide-rod D, substantially as and for the purposes described.

3. The pivoted and slotted sliding sleeve $f$, having arm $f'$ and gage-rod F, in combination with the transverse guide-rod $g$, substantially as and for the purposes described.

4. In a machine for sawing planks or boards into strips, the sliding saw C', the fixed saw C, the horizontally-adjustable gage F, and single carrying-rollers G, when constructed and arranged with relation to each other, and operating in the manner substantially as described.

THOMAS H. CARROLL.

Witnesses:
   JOS. T. K. PLANT,
   I. MASON GOSZLER.